United States Patent [19]

Miller

[11] Patent Number: 4,539,243

[45] Date of Patent: Sep. 3, 1985

[54] GLAZING SYSTEM

[76] Inventor: Philip N. Miller, 86 Litten Rd., Howick, Auckland, New Zealand

[21] Appl. No.: 621,873

[22] Filed: Jun. 18, 1984

Related U.S. Application Data

[63] Continuation of Ser. No. 419,311, Sep. 17, 1982, abandoned.

[30] Foreign Application Priority Data

Oct. 6, 1981 [NZ] New Zealand ........................ 198562

[51] Int. Cl.[3] ............................ E04C 2/38; B32B 3/06

[52] U.S. Cl. ........................................ 428/99; 428/34; 52/476; 52/824

[58] Field of Search ...................... 428/34, 99; 52/824, 52/308; 476

[56] References Cited

U.S. PATENT DOCUMENTS

| | | | |
|---|---|---|---|
| 2,228,358 | 1/1941 | Lowry . | |
| 3,303,626 | 2/1967 | Brigham . | |
| 3,435,574 | 4/1969 | Hallock . | |
| 3,696,575 | 10/1972 | Armstrong . | |
| 3,918,231 | 11/1975 | Kessler . | |
| 4,067,155 | 1/1978 | Ruff . | |
| 4,134,238 | 1/1979 | Auger . | |
| 4,147,005 | 4/1979 | Meyer . | |
| 4,231,204 | 11/1980 | Krueger et al. . | |
| 4,351,137 | 9/1982 | Enyart et al. ...................... | 52/824 X |

*Primary Examiner*—Alexander S. Thomas

*Attorney, Agent, or Firm*—Young & Thompson

[57] ABSTRACT

A glazing trim comprising two complementary extrusions having inter-engaging teeth, enable the extrusions to be connected together at different spacings enabling the glazing trim to accommodate sheets of different thicknesses. The glazing trim can be constructed on site by cutting the extrusions to length, and inter-engaging the locking teeth of the complementary extrusions by tilting one of the extrusions about a portion of the other until their teeth engage. A sheet of material can be held in place by resilient gaskets and wedges interposed between the sheet and the extrusions. Several shapes of extrusions are illustrated, together with a variety of different applications for the glazing trim.

1 Claim, 11 Drawing Figures

FIG. 8
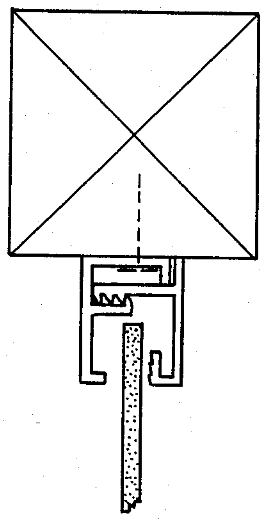
FIG. 6
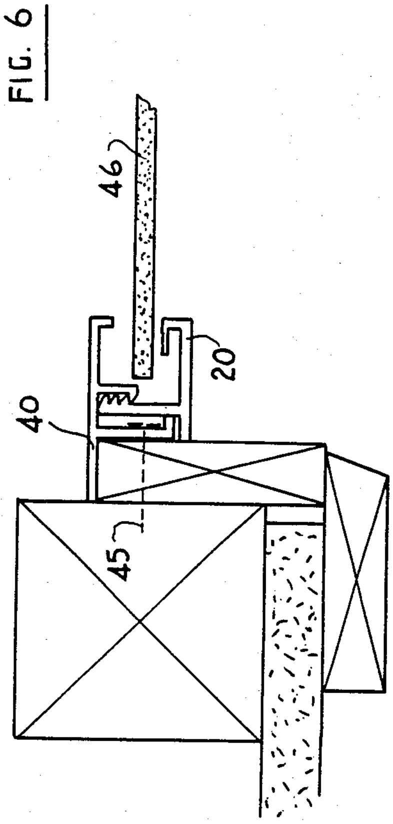
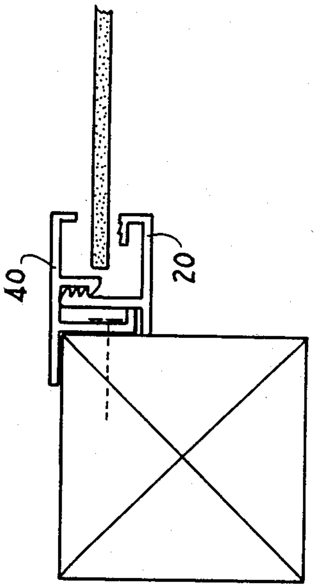
FIG. 7

GLAZING SYSTEM

This application is a continuation, of application Ser. No. 419,311, filed 9/17/82 abandoned.

This invention relates to a glazing system, and has particular application to the provision of glazing trim.

Hitherto, various extrusions have been proposed for the construction of metal framed windows. Such extrusions are usually formed of aluminium, and are provided of different sizes and shapes depending upon the size of window to be constructed. Such windows are constructed by factories specializing in "Aluminium Joinery", and each utilizes their own special extrusions. These existing extrusions are not suitable for installation on site, as they are not adaptable to different thicknesses of sheets.

It is an object of this invention to provide an improved glazing system, and in particular glazing trim capable of being installed on site.

In one aspect, the invention provides a glazing trim having a pair of elongate co-operable members, each said member having two limbs at substantially right angles to one another, and engaging means adapted to inter-engage a portion of said other member, wherein said members can be connected together at different spacings to accommodate sheets of material of different thicknesses therebetween.

Other aspects of this invention which should be considered in all its novel aspects, will become apparent from the following description, which is given by way of example only, with reference to the accompanying drawings, in which:

FIG. 6 through FIG. 11 illustrates different uses of the glazing trim.

Figure 1:
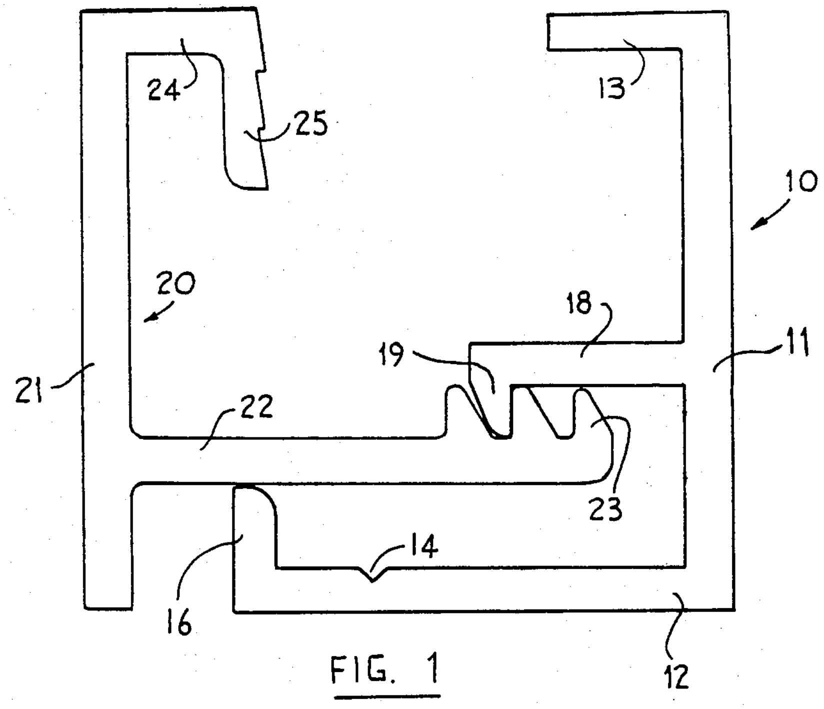
FIG. 1 illustrates a pair of glazing members in an intermediate spacing.

A first glazing member 10 has an upstanding limb 11 and a base 12 at right angles thereto. An interned flange 13 is provided on the upstanding limb, to accommodate a suitable resilient seal, not shown, between it and a sheet of glass or other material to be held by the glazing trim.

Glazing member 10 is a base member and is adapted to be connected to a wooden frame or the like. Conveniently, it has a groove 14 in the base thereof to facilitate the drilling of screw holes or the like, for mounting the member onto a wooden frame. The end of the base portion 12 is provided with an upstanding flange 16 capable of providing a rest for the second glazing member 20.

This base member 10 has a locating limb 18 extending inwardly from the upstanding limb 11, and terminates in a downwardly facing bevelled tooth 19 which serves to provide engaging means capable of interengaging the glazing member 20. Both the glazing member 10 and the glazing member 20 can be of uniform cross-section, and thus formed as extrusions of indefinite length.

The glazing member 20 is preferably a locking section and has an upstanding limb 21 and a locating limb 22 extending at right angles thereto. This locating limb 22 has a plurality of upstanding bevelled teeth 23, of shape complementary to the tooth 19 of the member 10. FIG. 1 shows three such teeth 23, enabling three adjustable positions, and hence provision for the reception of sheets of three different thicknesses. By providing the teeth in the bevelled fashion shown in FIGS. 1 and 2, it will be noted that the teeth 23 of the locking section 20 can be slid over the tooth 19 of the base section 10 as the glazing trim is assembled.

Locking section 20 is also provided with flanges 24, 25 at the top thereof, with flange 25 being provided with ridges thereon to retain a resilient wedge.

Figure 2:
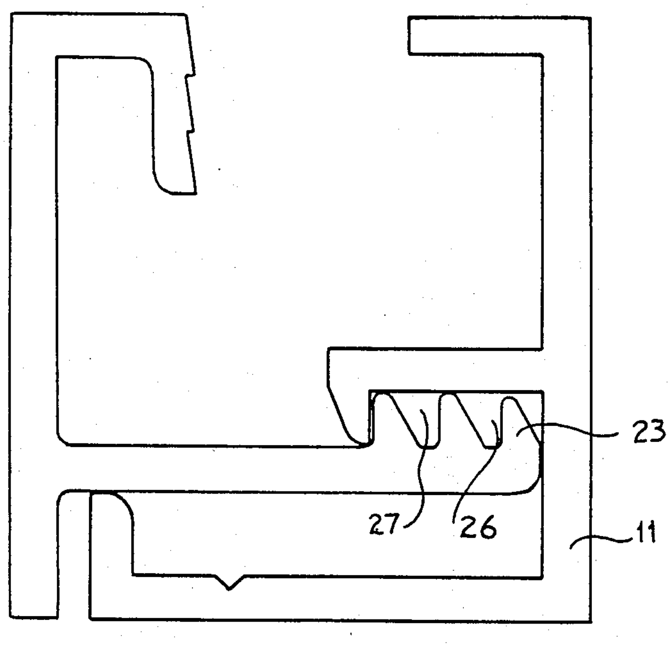
FIG. 2 shows the glazing members connected together at a close spacing.

FIG. 2 shows the glazing members 10 and 20 in the close spaced position such that the forward tooth 23 of member 20 butts against the upstanding limb 11 of member 10. Although not shown, it will be appreciated that a much wider spacing than FIG. 1 can be achieved by locating tooth 19 into the forward valley 26 in place of the valley 27 in which it is located in FIG. 1.

Figure 3:
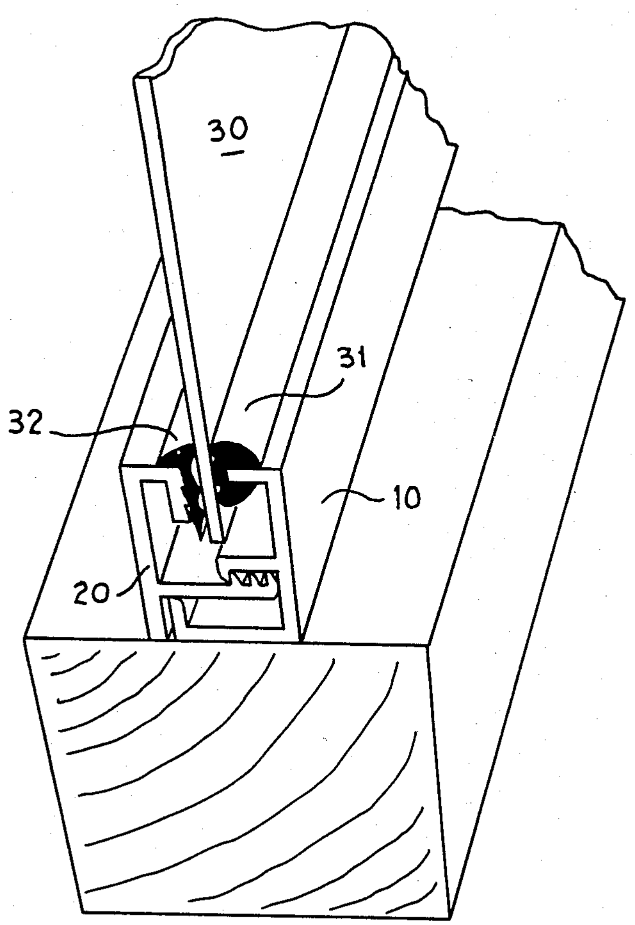
FIG. 3 is a perspective view of glazing members mounted on a timber frame showing glazing wedges holding a sheet of material therebetween.

FIG. 3 shows a sheet of material 30 positioned within the glazing members 10 and 20 in the close spaced position of FIG. 2. The sheet 30 is held in place by a backing gasket 31 and a wedge 32. Conveniently, these are both formed of a resilient material such as rubber, neoprene, or the like.

Figure 4:
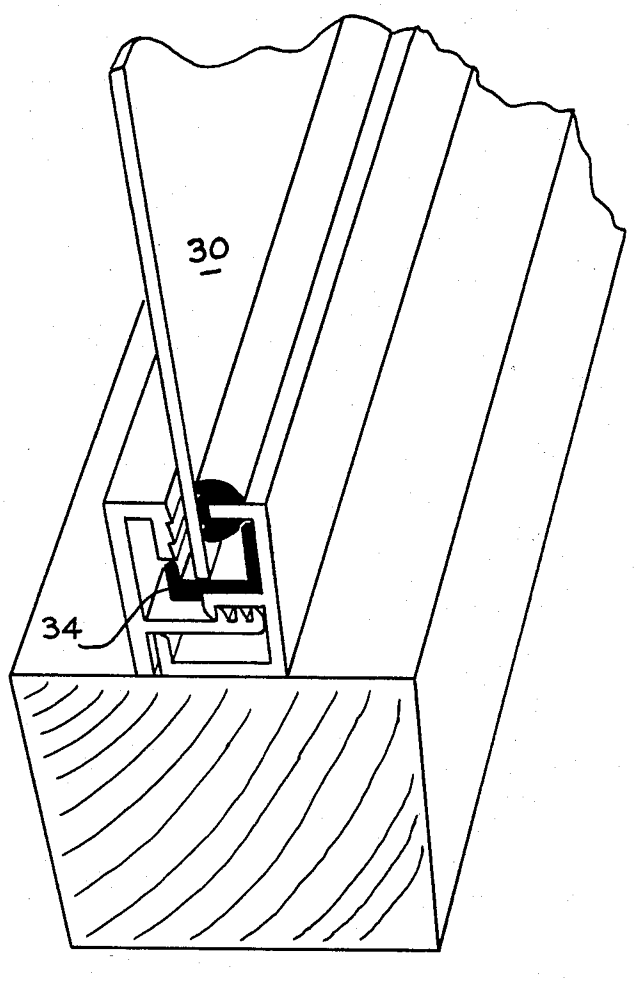
FIG. 4 is similar to FIG. 3, except that one of the glazing wedges has been removed to show the position of a setting block.

FIG. 4 shows a similar arrangement, except that the resilient wedge 32 has been removed, to show the location of a setting block 34. The purpose of the setting block 34, is to facilitate location of the sheet 30 within the glazing members, during assembly, and to minimize the risk of the sheet 30 dropping down within the recess formed between the two glazing members.

In order to assemble the glazing trim, for example in the formation of a window, the timber or other frame can be constructed, and the glazing trim cut to size to fit within the opening defined by the frame. The glazing trim can conveniently be connected together in butt fashion at the corners, and thus for example the vertical glazing members can run the entire height of the window frame, whilst the horizontal glazing members can run the distance between the vertical glazing members. The corners of the top and bottom base sections may be cut back a few millimeters to facilitate the installation of the vertical locking sections. The base sections can then be fitted to the frame by appropriate fasteners such as nails, screws or the like. The fasteners conveniently pass through the base of the base section, through the groove 14 which serves as a locating groove. The resilient backing gasket 31 can then be fitted to the top flange of each of the base section members 10. The optional setting block members 34 can then be provided along the bottom base section 10, and as the setting blocks are conveniently provided in short lengths, they can be spaced apart from one another at convenient spacings depending upon the size of sheet 30 to be fixed between the glazing members. Then the sheet 30 is positioned on the setting blocks, and pressed against the backing gaskets. The side locking sections, are then inserted, then the top locking sections. They can be inserted by pivoting them slightly to ride under the tooth 19 of the base section members. This will be noted from the dismantling operation shown in FIG. 5. The glazing wedges 32 can then be inserted in the sides and top, and finally the bottom locking section positioned, and its glazing wedge inserted.

Figure 5:
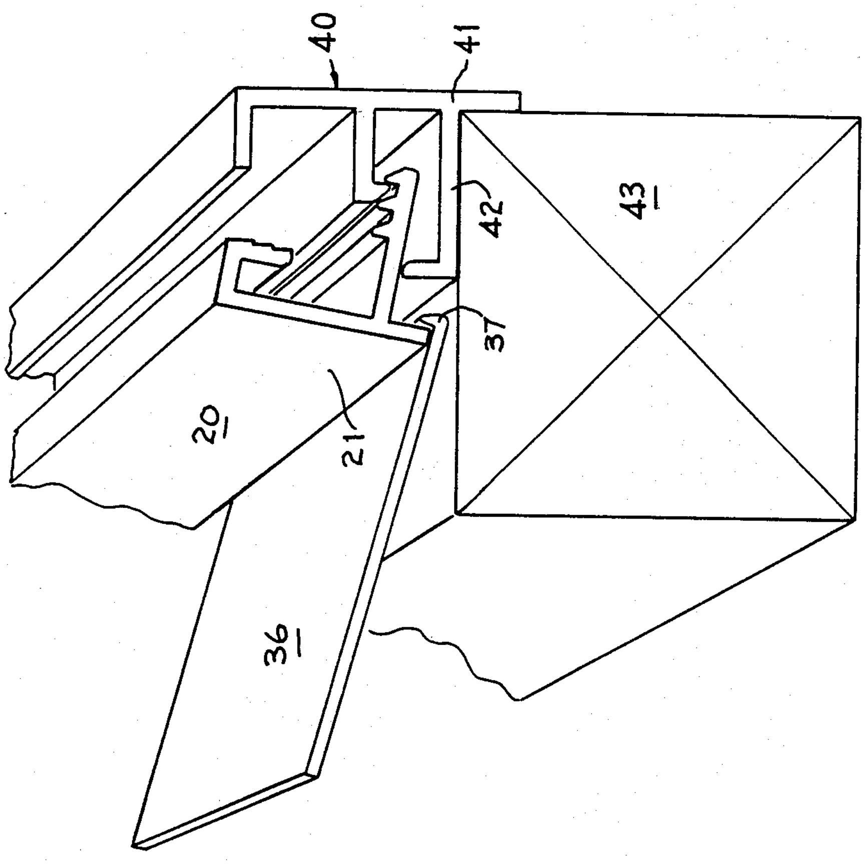
FIG. 5 illustrates the dismantling of the glazing members.

If the glazing trim is to be dismantled, the glazing wedges are first removed, and then the locking member 20 is conveniently hooked out with a deglazing tool 36. A deglazing tool can be formed from a strip material having an upturned edge 37 capable of hooking under the lower end of the limb 21 of the locking member. This is shown in FIG. 5. FIG. 5 also shows a modified base section 40 having a limb 41 which extends down below the base 42 and hence overlaps the corner of a timber frame member 43. Such a section can be used for a weather section. The base section shown in FIGS. 1 through 4 is designed for internal use.

FIGS. 6 through 11 show various uses of the glazing trim, and show different types of base sections.

For example, FIG. 6 shows the glazing trim used as a jamb liner utilizing the enlarged weather section 40 in conjunction with a locking section 20. A fastener is shown schematically at 45, whilst a sheet of material 46 is shown, but without the backing gasket or glazing wedge, which would be inserted to hold the sheet 46 snugly in place.

FIG. 7 shows a weather installation with the weather section 40 and a locking member 20.

FIG. 8 shows an infill arrangement corresponding to FIG. 3.

Figure 9:
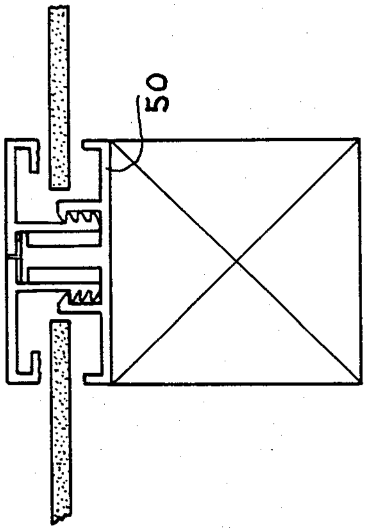

FIG. 9 shows an overlay utilizing a joiner 50 which corresponds to two of the base sections 10, back to back.

Figure 10:
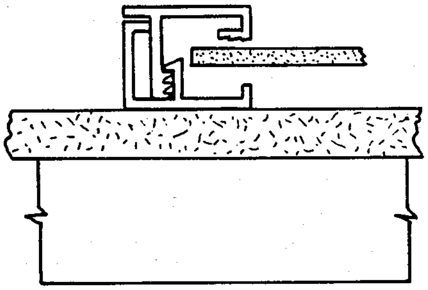

FIG. 10 shows a vertical section through a wall panel assembly using the sections 10 and 20.

Figure 11:
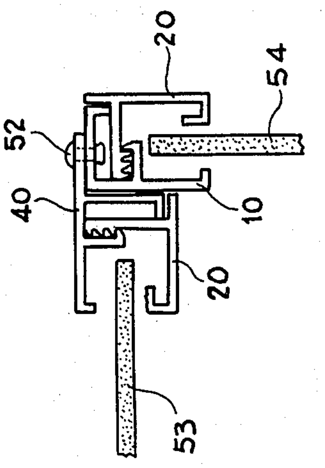

FIG. 11 shows a corner assembly, in which a base section 10 is pop-riveted at 52 to a base section 40, and sheets of material 53, 54 are held in place by a pair of locking members 20.

It will be appreciated that the glazing trims of this invention can be used in a simple yet versatile manner to accomplish a variety of tasks. As the glazing trim consists of two complementary members, they can be fitted together in a variety of ways to accommodate different sizes of panels. For glazing purposes, the three teeth of the locking member, combined with the single tooth of the base section member enable extrusions to be used for the construction of windows capable of accommodating sheets of two millimeter, four millimeter, and six millimeter thicknesses. These sizes are given by way of example only, as the glazing members can be adapted to accommodate sheets of different sizes. It is a particular advantage of this invention that the provision of the two limbs at right angles to one another, together with the engaging means, enables window frames, office partitions, and other sheets of material to be readily installed and held by the glazing trim without the need to have frames especially made by aluminium joinery factories.

Finally, it will be appreciated that various alterations and modifications may be made to the foregoing without departing from the scope of this invention as exemplified by the following claims.

I claim:

1. A glazing trim having a pair of elongate cooperative members, each said member having, in cross section, two limbs substantially at right angles to each other, and engaging means comprising a plurality of teeth on one surface of one of said limbs adapted to interengage at least one tooth on a corresponding limb of said other member, whereby said members can be connected together at different spacings to accommodate sheets of material of different thicknesses therebetween, each of said members having a re-entrant flange on the other said limb which engages a respective resilient member in use between the flange and window pane, wherein the members, once connected together, can be disconnected by removing at least one of said resilient members and tilting said pair of elongate cooperable members relative to each other in a direction such that said re-entrant flanges move toward each other, thereby to disengage said engaging means, one of said pair of elongate cooperable members having thereon a base flange disposed on the side of said one limb that is opposite said re-entrant flange on said one elongate member, said base flange having an upstanding flange that contacts said one limb on the other said elongate cooperable member to limit tilting movement of said elongate cooperable members in a direction such that said re-entrant flanges move away from each other thereby to retain said resilient members and said window pane firmly held between said re-entrant flanges.

* * * * *